United States Patent [19]

Stromberg

[11] 4,204,661
[45] May 27, 1980

[54] WASTELESS CONNECTING VALVES

[76] Inventor: Thore Stromberg, P.O. Box 295, S60104 Norrkoping, Sweden

[21] Appl. No.: 902,303

[22] Filed: May 3, 1978

[51] Int. Cl.² .............................................. F16K 35/02
[52] U.S. Cl. ........................................ 251/95; 137/315; 137/319; 137/238; 251/319; 251/324; 138/89; 138/94
[58] Field of Search ................ 137/315, 319, 320, 322, 137/238, 329.1; 251/89, 95, 101, 102, 103, 107, 111, 113, 319, 324; 138/89, 94

[56] References Cited

U.S. PATENT DOCUMENTS

| 578,142 | 3/1897 | Fierz | 137/238 |
| 2,230,434 | 2/1941 | Porter | 137/315 |
| 2,771,096 | 11/1956 | Ver Novy | 138/89 |
| 2,988,111 | 6/1961 | Ver Novy | 138/89 |
| 3,155,116 | 11/1964 | Ver Novy | 138/89 |
| 3,923,082 | 12/1975 | Blazek | 138/89 |
| 3,949,963 | 4/1976 | Aoki | 251/144 |
| 3,991,791 | 11/1976 | Luckenbill | 138/94 |
| 4,026,324 | 5/1977 | King et al. | 137/238 |
| 4,144,909 | 3/1979 | Harrison | 138/94 |

FOREIGN PATENT DOCUMENTS 504203 6/1920 France ...................................... 137/319

Primary Examiner—Martin P. Schwadron
Assistant Examiner—G. L. Walton
Attorney, Agent, or Firm—Jordan and Hamburg

[57] ABSTRACT

A connection valve for connecting together and disconnecting a tank and a hose without wastage or spillage. A first housing part has a duct containing a slidable piston and communicating with at least one connection socket. A second part has a throughbore, a socket coaxial with the duct, a plug for sealing said socket, and a locking device for locking the plug in a sealing position. An axial drawing means is provided for pressing a surface of rotation of the plug against a mating surface of the piston.

2 Claims, 1 Drawing Figure

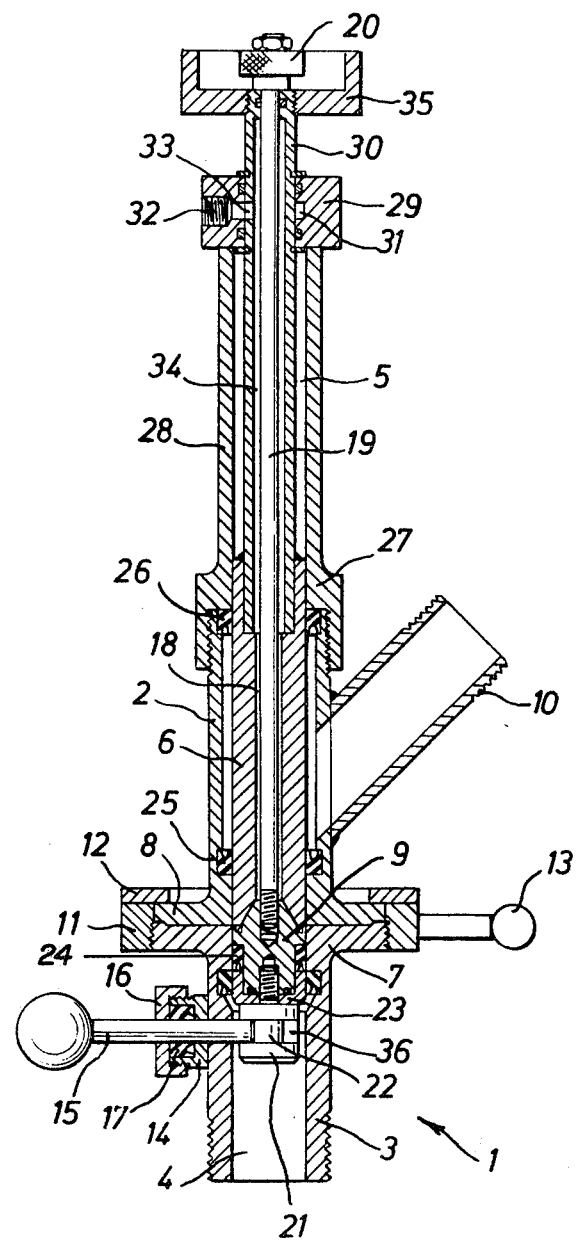

WASTELESS CONNECTING VALVES

The invention relates to wasteless connecting valves. Such valves may be used for gases, liquids, or fluid powders and allow through-flow in either direction without obstruction.

There exist a number of connections combined with cut-off valves for connecting two hose ends, a hose end and a tube end, or a hose and a tank, for the purpose of preventing or reducing waste when they are connected and/or disconnected. Most of these are based upon valve seats disposed in two halves of the valve and valve bodies bearing on the valve seats, the valve bodies being spring-loaded and/or pressure loaded and provided with projections facing one another and disposed so that during connection they may push the valve bodies from their seats.

These valve bodies remaining in the ducts always give rise to considerable constrictions in the flow of the media. Neither can they completely close the pipes before the connection halves have been taken apart and, as a result, there is always a greater or lesser amount of waste at each connecting operation.

When larger pipes and high pressures are involved this waste can be considerable. It has happened, for example, that the waste in the case of connecting and disconnecting a quite large tanker to a receiver tank on land could amount to 150 litres of oil per connection.

When poisonous and/or ecologically harmful media are involved, it is naturally of the utmost importance that waste should be substantially, and preferably completely prevented.

According to the invention there is provided a wasteless connecting valve comprising two housing parts which are provided with devices for sealingly connecting them together, one of the housing parts being provided with an internally and externally cylindrical and internally smooth socket and the other housing part being provided with a cylindrical and internally smooth duct coaxial with the socket of the one housing part when the two parts are connected together; the duct having the same internal diameter as the socket, a piston being slidably and sealingly mounted in the duct, the other housing part being provided with at least one connection socket directed to the side and opening into the duct, the housing part being provided with a locking device disposed so that, in its locking position, it engages in a corresponding recess in a plug which is slidably and sealingly mounted in a through bore of the one housing part and which is disposed so that it may be pressed with a surface of rotation concentric about the central axis of the plug sealingly against a corresponding surface of rotation on the piston by an axial drawing device.

The invention will be further described by way of example with reference to the accompanying drawing, which shows a preferred connection valve in central cross-section.

Two connection halves 1 and 2 are provided with their face-ground flanges 7 and 8 respectively preferably provided with orientation ledges and corresponding recesses. The flanges 7 and 8 are provided with devices to press them sealingly against one another. Such a device is shown in the drawing as a nut 11 provided with a flange 12, disposed so that it may be screwed by means of a handle 13 on to one flange 7 to press this against the other flange 8. This device does not constitute a part of the present invention and a large number of other devices may be used for this purpose.

The connection half 1 is provided with a socket 3, perpendicular to the flange 7 and concentric with it, disposed so as to be sealingly connected to a tank or pipe line, and with a cylindrical through bore 4 concentric with the socket 3 and the flange 7. In addition, the socket 3 is provided with a radial socket 14 with a central opening therein, in which a locking device 15 is slidingly fitted and provided with a butt seal 17 retained by a cap 16.

The connection half 2 is provided with a central, axial cylindrical duct 5 coaxial with the through bore 4 of the connection half 1 when the connection halves 1 and 2 are connected, the duct 5 having exactly the same diameter as the through-bore 4, in which a piston 6 is slidingly and sealingly fitted. The connection half 2 is provided with at least one connection socket 10 directed to the side and opening into the duct 5, the connection socket 10 being disposed so that it may be connected to a hose from a supply tank (not shown).

The piston 6 is provided with a central cylindrical through duct 18 in which a connecting bar 19 is disposed with lost motion. At one of its ends adjacent the half 1, the connecting bar 19 is provided with threads and at its other end with a turning head 20.

The end of the connecting bar 19 provided with threads is disposed so that it may be screwed into a plug 9 of exactly the same diameter as the piston 6 and may pull a tapered end on the plug 9 sealingly towards a corresponding funnel-shaped recess in the end of the piston 6. At its opposite end, the plug 9 is provided with a knob 21 screwed therein, which is provided with an annular groove 22 interrupted by a notch 36, the locking device 15 being disposed so as to engage in the latter. Between the knob 21 and the main part of the plug 9, the end of which facing the knob 21 has a smaller diameter than the through-bore 4, there is a cover 23 with an external diameter which fits slidingly into the through-bore 4 and which leaves an annular groove free for a butt seal 24.

The housing half 2 is provided on both sides of the connection socket 10 with internal annular grooves for butt seals 25 and 26 which bear sealingly on the piston 6. This is so long that its upper part in the drawing, when the plug 9 is locked with the locking device 15 and joined to the piston 6, reaches somewhat beyond a cap 27 closing the housing half 2. This cap 27 is provided with a shaft 28 coaxial with the duct 5 with a continuation of the duct 5. The shaft 28 is adjacent a cap 29 at its free end in the position shown in the drawing.

At its end adjacent the shaft 28 the piston 6 is provided with a cylindrical shaft 30 which passes sealingly through the cap 29 with its free end and to which the cap 29 is rigidly fixed. This is provided with an annular duct 31 surrounding the shaft 30, it being possible to connect the said annular duct 31 to a pressure medium source by way of a screw cap 32. Through an opening 33 in the shaft 30 the annular duct 31 communicates with a longitudinally extending duct 34 disposed therein, through which the connecting bar 19 passes. The shaft 30 is provided at its free end with a handle 35, through which the connecting bar 19 is sealingly and rotatably fitted.

The preferred connecting valve operates in the following manner:

In an initial position, the housing half 1 is connected for example to a tank not shown and the plug 9 is disposed therein and locked firmly with the locking device 15 engaging in the annular groove 22.

The housing half 2 is connected by a connection socket 10 to a hose not shown for example from a tank lorry and the piston 6 is inserted so that its end is in alignment with the outside of the flange 8.

For connecting, the flange 8 is brought towards the flange 7 and both the flanges 7 and 8 are joined sealingly by screwing the nut 11 on the flange 7. Then the connecting bar 19 is screwed with its threaded end portion into the plug 9 which meanwhile is prevented from rotating by the notch 36, so that the plug 9 is pressed against the piston 6. When the locking device 15 is then pulled out of the annular groove 22, the piston 6 may be pulled by means of the connecting bar 19 into the shaft 28 and takes with it the plug 9 so that the load of the tank lorry can flow into the fixed tank without any waste.

For closing and disconnecting, the piston 6 is pushed with the plug 9 out of the shaft 28 until the plug 9 has returned to its initial position where it is locked by pushing the locking device 15 in the annular groove 22. Then the threaded portion of the connecting bar 19 is screwed out of the plug, the nut 11 is screwed off the flange 7, and the housing half 2 is lifted away from the housing half 1. If the disconnection is being carried out in a dusty location it is advisable in connection with dismounting the housing halves to pump compressed air from the screw cap 32 through the duct 34 and the central duct 18 of the piston slide 6 and out between the flanges 7 and 8. Disconnecting too can clearly be carried out without any waste.

If several substances are to be fed to the fixed tank at the same time, the housing half 2 can be provided with several connection sockets 10, each of the latter being connected to its radial duct in the housing half 2.

I claim:

1. A wasteless connecting valve, first and second housing parts, including a pair of flanges sealing means for holding said flanges together in sealing engagment, a socket provided on said first housing part, a piston, at least one connection socket, a locking device, a plug having a recess and a surface of rotation concentric about a central axis thereof, and an axial drawing device, said socket is internally and externally cylindrical and internally smooth, said second housing part has formed therein a cylindrical and internally smooth duct coaxial with said socket when said first and second housing parts are connected together, said duct having substantially the same internal diameter as said socket, and said piston is sealingly and slidably mounted in said duct, said second housing part being provided with said at least one connection socket directed to the side and opening into said duct, said locking device being disposed in said first housing part so as to engage in a locking position said recess in said plug, said plug being slidably and sealingly mounted in a throughbore of said first housing part and, said piston including a bottom surface which abuts a corresponding surface of said plug, said bottom surface and said corresponding surface being substantially coplanar with the interfaces of said flanges disposed so as to be pressed by said axial drawing device with said surface of rotation against said corresponding surface of rotation on said piston to effect a seal therebetween.

2. A connecting valve according to claim 1, wherein said piston is disposed so as to be pulled back together with said plug into said duct past said at least one connection socket to thereby leave said throughbore free in both directions.

* * * * *